United States Patent [19]

Hage

[11] 4,179,215
[45] Dec. 18, 1979

[54] RECIRCULATING DOCUMENT FEEDER

[75] Inventor: Charles T. Hage, Rochester, N.Y.

[73] Assignee: Eastman Kodak Company, Rochester, N.Y.

[21] Appl. No.: 927,257

[22] Filed: Jul. 24, 1978

[51] Int. Cl.² .................. G03B 27/48; G03B 27/50; G03G 15/00; B65H 5/22

[52] U.S. Cl. ........................... 355/50; 271/4; 355/3 SH; 355/14 SH

[58] Field of Search .................. 271/3.1, 4, 64, 197; 355/3 R, 3 SH, 14, 50, 51

[56] References Cited

U.S. PATENT DOCUMENTS

| Re. 27,976 | 4/1974 | Sahley ................................ 355/64 |
| Re. 29,178 | 4/1977 | Colwill ........................... 271/3.1 X |
| 3,556,511 | 1/1971 | Howard et al. ...................... 271/4 |
| 3,563,532 | 2/1971 | Street ............................... 271/26 |
| 3,684,367 | 8/1972 | Vassitch ............................ 271/4 |
| 3,747,918 | 7/1973 | Margulis et al. ..................... 271/4 |
| 3,914,047 | 10/1975 | Hunt, Jr. et al. .................. 355/16 |
| 4,076,408 | 2/1978 | Reid et al. ....................... 355/14 |
| 4,078,787 | 3/1978 | Burlew et al. .................... 271/3.1 |
| 4,140,387 | 2/1979 | Gustafson ......................... 355/14 |

FOREIGN PATENT DOCUMENTS 1492466 11/1977 United Kingdom ........................ 355/64

OTHER PUBLICATIONS

Research Disclosure, Industrial Opportunities, Ltd., Homewell, Hauant, Hampshire, P091EF, United Kingdom, pp. 47, 48.

*Primary Examiner*—Richard A. Wintercorn
*Attorney, Agent, or Firm*—G. Herman Childress

[57] ABSTRACT

A recirculating document feeder feeds document sheets to an exposure station wherein the sheets can be exposed for copying. The feeder includes a support which receives and holds one or a plurality of document sheets. A vacuum feeder sequentially removes sheets from the bottom of the stack in the support. A vacuum belt sheet transport picks up the sheets removed from the support and circulates the sheets from the support to the exposure station and then away from the exposure station. The transport is of a size to simultaneously circulate a plurality of document sheets. At the appropriate time in the machine cycle a separator removes the sheet from the sheet transport and directs the removed sheet back to the support and on to the top of any other document sheets in the support. A feeding control is provided for selectively operating the feeder in any one of several modes of operation depending on the relationship between the number of document sheets in the support and the number of sheets that can be transported at one time by the transport. More specifically, the document sheets can be removed seriatim from the stack in the support, circulated once to the exposure station and then returned to the support on top of the other document sheets. Alternatively, the sheets can be removed seriatim from the bottom of the stack in the support, retained on the transport while they are circulated to the exposure station once or a plurality of times in order to make the total number of copies required, and then the sheets are returned to the stack in the original order. In another mode of operation a single sheet can be removed from the support, transported to the exposure station for copying one or more times and returned to the support.

9 Claims, 3 Drawing Figures

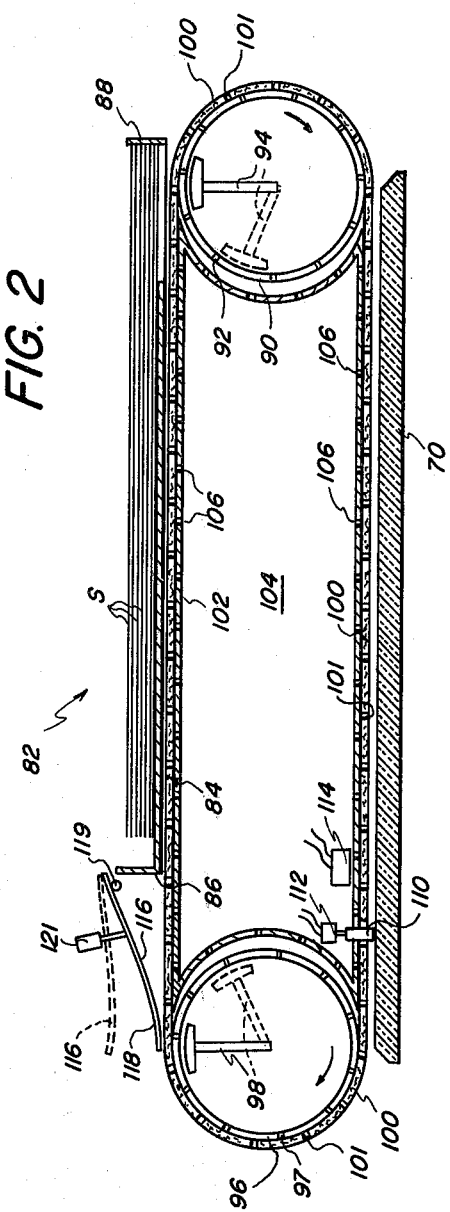

RECIRCULATING DOCUMENT FEEDER

BACKGROUND OF THE INVENTION

1. Field of the Invention

The present invention relates to apparatus for circulating document sheets to an exposure station, for example the exposure station of a copier/duplicator or the like. More specifically, the invention relates to a recirculating document feeder adapted to operate in several different modes depending upon the number of sheets in the document to be copied.

2. Description of the Prior Art

Recirculating document feeders are well known in the prior art. Commonly assigned Reissue Patent No. RE 27,976 entitled DOCUMENT FEEDER which issued on Apr. 23, 1974, discloses such a feeder in which document sheets are fed from a supply to an exposure station and back to the supply. Commonly assigned British Pat. No. 1,492,466 entitled RECIRCULATING SHEET FEEDER FOR DOCUMENT COPYING, which issued on Mar. 22, 1978, discloses a recirculating document feeder wherein document sheets are placed in a tray with the document sheets in the normal page sequence order and with first sheet of the document facing upwardly. The sheets are then removed from the tray, bottom sheet first, and fed to a platen where the sheet is exposed for copying by an associated copier. The document sheet is then fed back to the tray and on top of other document sheets in the tray. This cycle is repeated until all of the document sheets are exposed one or more times, and collated sets of copies are produced in the copier. The associated copier/duplicator is preferably controlled by a microprocessor as disclosed, for example in commonly assigned U.S. Pat. No. 3,914,047 which issued on Oct. 21, 1975 in the name of W. E. Hunt, Jr., et al and is entitled SYNCHRONIZING CONTROL APPARATUS FOR ELECTROPHOTOGRAPHIC APPARATUS UTILIZING DIGITAL COMPUTER. Preferably the computer control apparatus for the copier is also coupled to the recirculating feeder to obtain coordinated operation. Two patents disclosing this relationship are commonly assigned U.S. Pat. No. 4,076,408, which issued Feb. 28, 1978 in the names of M. G. Reid, et al, entitled COLLATING DOCUMENT FEEDER WITH MULTIPLE FEED DETECTOR, and U.S. Pat. No. 4,078,787, which issued on Mar. 14, 1978 in the names of L. E. Burlew, et al, entitled AUTOMATIC FEEDER AND COPIER OPERATIONS. Various modes of operation are disclosed in the before mentioned patents. In one mode of operation (the so-called collate mode of operation) a plurality of document sheets placed in a supporting tray are fed seriatim from the tray to an exposure position at the copier platen and copied once before being returned onto the top of the stack in the tray. This mode of operation produces one or multiple sets of collated copies in the copier. In the second mode of operation (the so-called non-collate mode of operation) a document sheet is fed to the exposure station at the platen and held in place while multiple copies of that single document sheet are copied. The document sheet is then returned to the supporting tray.

Other types of recirculating document feeders are known, including those feeders which utilize vacuum sheet transport means for all or a portion of the movement of the document sheets. In this regard, reference is made to U.S. Pat. No. RE 29,178 and to U.S. Pat. No. 3,562,532. The latter patent relates to a variable speed drive transmission associated with a vacuum feed mechanism which operates to vary the spacing of sheets drawn onto the vacuum belt. Another automatic feeding device utilizing a vacuum sheet transport is shown and described in Disclosure No. 15,056 which appears at pages 47 and 48 of the October, 1976 edition of Research Disclosure, a publication by Industrial Opportunities, Ltd., Homewell, Havant, Hampshire, PO91EF, United Kingdom. The feeder device disclosed in the latter publication comprises a vacuum feeder which separates the bottom most sheet from the stack and furnishes it to a plurality of vacuum belts. The belts deliver the sheets seriatim to a platen for exposure and then return the sheet to the top of the stack in the tray.

SUMMARY OF THE INVENTION

This invention relates to an improvement in an apparatus for feeding document sheets seriatim to an exposure station of a copier for exposure. The apparatus has support means for receiving and holding a plurality of document sheets, and means for removing the sheets sequentially from the support means. Means are provided for returning the removed sheets to the support means following a plurality of exposures at the exposure station. The improvement of the invention comprises means for repeatedly transporting the removed sheets seriatim to the exposure station for exposure prior to returning the removed sheets to said support means.

BRIEF DESCRIPTION OF THE DRAWINGS

In the detailed description of the preferred embodiment of the invention presented below, reference is made to the accompanying drawings, in which:

FIG. 2 is a cross section through the sheet feeding apparatus shown in FIG. 1; and FIG. 3 is a fragmentary view of the control panel shown in FIG. 1.

DESCRIPTION OF THE PREFERRED EMBODIMENT

Figure 1:
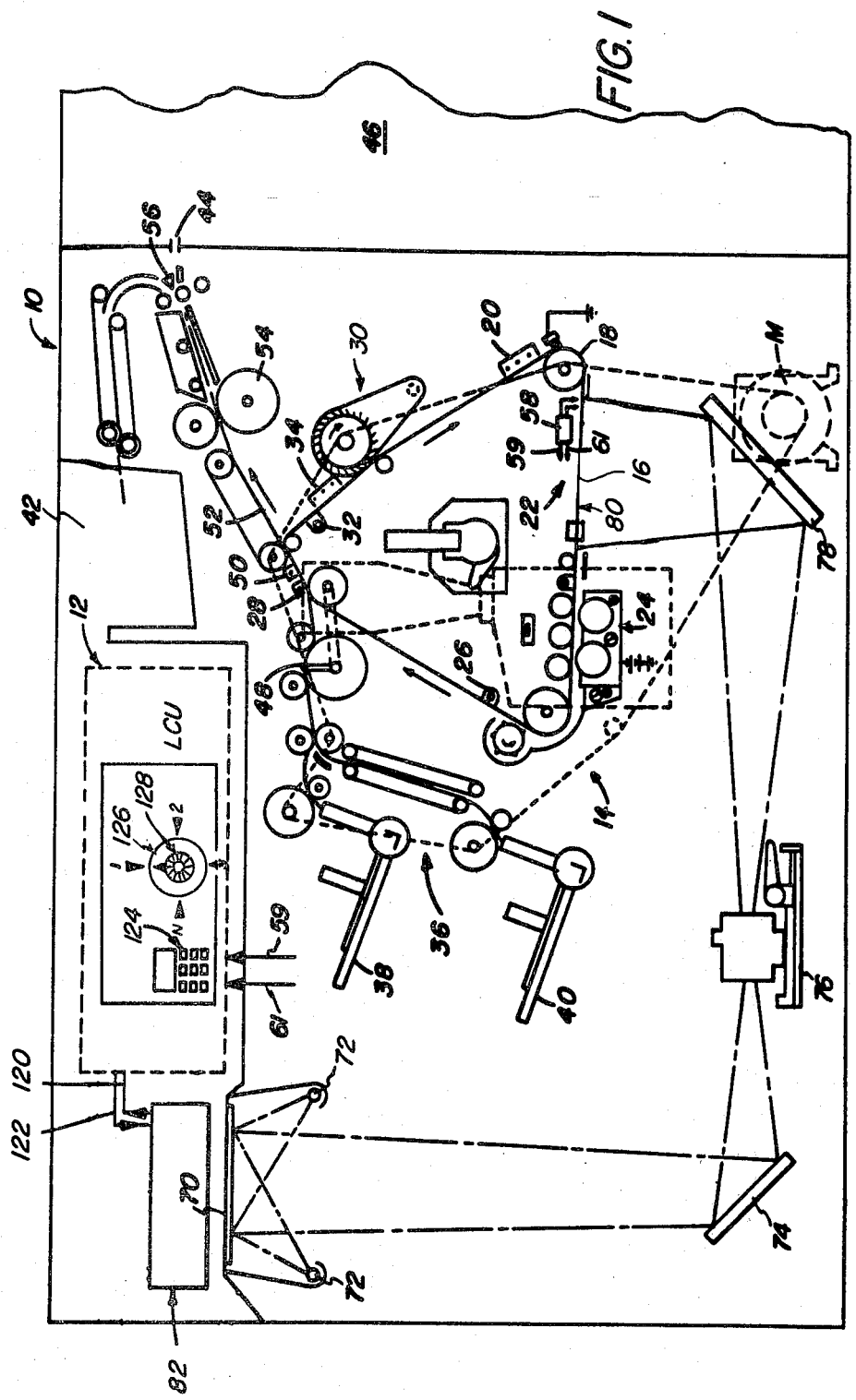
FIG. 1 is a schematic representation of a copier and a preferred embodiment of the apparatus of this invention.

Referring now to the drawings, a copier/duplicator with sheet feeding apparatus of the present invention is illustrated generally at 10 in FIG. 1. The copier includes a logic and control unit (LCU) 12 which monitors and controls various elements of the copier. A copier process section 14 has a photoconductor 16 trained to run in a closed-loop path about a plurality of web-constraining rollers. One of these rollers 18 is coupled to a drive motor M so that the photoconductor is driven in a clockwise direction in its closed loop path when the motor is connected to an appropriate source of potential. This movement of the photoconductor causes successive image frames on the photoconductor sequentially to pass adjacent a series of electrophotographic work stations which, for the purpose of this disclosure, can be described as follows:

a charging station 20 at which the photoconductor is sensitized by receiving a uniform electrostatic charge;

an exposing station 22 at which the photoconductor receives a latent electrostatic image by projecting a light pattern representing the document sheet onto the sensitized photoconductor;

a developing station 24 at which the latent electrostatic image is rendered visible by the application of toner;

a post development erase station 26 at which the photoconductor is illuminated to remove the residual charge on the photoconductor;

an image transfer station 28 at which the developed and visible image is electrostatically transferred from the photoconductor to one side of a copy sheet; and a cleaning station 30, including erase and discharging devices 32 and 34, respectively, at which the photo-conductor is cleaned of any residual marking particles and electrostatic charge.

A copy handling mechanism 36 moves copy sheets, or other suitable supports, in a path from either of two supply hoppers 38 and 40, through the transfer station 28, and on to either a delivery hopper 42, where the copies are deposited, image side up, for retrieval by the operator, or an exit 44, where the copies can be delivered to a finisher 46 for suitable finishing operations, such as jogging, stapling and stacking. Additional stations located along this path of movement include the following:

a registration device 48 for establishing proper alignment between the copy sheets in the copy handling mechanism and the image frame of the photoconductor;

a discharging device 50 for reducing electrostatic attraction between the copy sheets and the photoconductor in order to facilitate separation of the copy sheets from the photoconductor; a suitable transport 52 for the unfused copy sheets;

a fusing device 54 for permanently fixing the toner to the copy sheets by the application of heat and pressure; and a sheet diverter 56 for directing the copy sheets to either the delivery hopper 42 or exit 44.

The logic and control unit 12 coordinates operation of the various copier stations with movement of the copy sheets and the latent and visible images on the photoconductor. To facilitate this coordination, the photoconductor preferably is provided with a plurality of perforations, not shown, adjacent one of its edges. Means 58 adjacent the photoconductor sense the perforations. Signals from the sensing means are furnished to the logic and control unit 12 by leads 59 and 61. Additional sensors are provided in the copy path. In this manner input signals can be generated to which the LCU can respond for sequentially operating the work stations as well as for controlling the operation of many other machine functions. Similarly, output data and control signals from the LCU are applied to the work stations. The output signals from the LCU 12 are logic level digital signals which are buffered and amplified to provide drive signals to various clutches, brakes, solenoids, power switches, and numeric displays in various portions of the apparatus described herein. More complete descriptions of suitable means for coordinating operations in a copier and an associated document feeder is disclosed in the before mentioned, commonly assigned, U.S. Pat. Nos. 3,914,047; 4,076,408 and 4,078,787.

The copier has a platen 70 where documents are positioned for copying. A document on platen 70 is illuminated by flash lamps 72. An image of the document is reflected by a mirror 74 to a lens 76, projected by the lens onto a second mirror 78, and reflected to an image plane 80 formed along a flat portion of the photoconductor 16 in the area of the exposing station 22. Copier/duplicator apparatus as previously described is generally known in the art.

In accordance with the present invention document sheets are fed to an exposure station at the platen 70 by a recirculating document feeder 82. In one mode of operation the recirculating feeder is used for making collated sets of copies of the document by recirculating each document sheet to the platen for copying in a sequence that results in collated copies being made by the copier. When one or more copies of only a single document sheet are required, the document sheet is fed to the platen only once and held in position for making the required number of copies.

Referring now to FIG. 2, the recirculating feeder 82 includes a hopper 84 that is located above and spaced from the platen 70 in a location where it is readily accessible for receiving and supporting one or a set of original document sheets, each sheet being designated S. The sheets are placed in the hopper face up and in their normal page-sequential order for delivery, one after another, last sheet first, from the bottom of the set to the platen 70 for copying, and ultimately are returned to the hopper on top of any other document sheets S that are then located in the hopper. Hopper 84 comprises a tray 86 that is closed along a major portion of its bottom and is open adjacent to an end wall 88. The tray may be inclined downwardly toward wall 88 so that gravity assists in aligning the document sheets against the wall 88. A more complete description of a suitable hopper may be found in the before mentioned commonly assigned British Pat. No. 1,492,466.

Document sheets are removed from the bottom of the stack in the hopper by means of a vacuum tube 90 which is located beneath the opening in the bottom of the tray and has a plurality of ports 92 therein through which vacuum can be applied. Vacuum from a source (not shown) is applied to the interior of the tube. A suitable valve member 94 is moved by means (not shown) from the position illustrated in solid lines wherein it is located substantially beneath the opening in the tray 86 to a second position shown in dotted lines wherein it is spaced therefrom. When the valve member is in its dotted line position the lower sheet in the tray comes under the influence of vacuum in tube 90 to cause separation of that sheet from other sheets in the tray. Rotation of the vacuum tube in the direction shown by the arrow removes the lowermost sheet from the tray and begins its advancement around the tube in a clockwise direction.

A similar vacuum tube 96 having ports 97 therein is located at the other end of the feeder and it also is adapted to rotate in a clockwise direction. The tube 96 has a valve member 98 associated therewith which is movable between the solid and dotted line positions illustrated in the drawings by any suitable means (not shown) to selectively block the application of vacuum to an upper portion of the tube or allow the application of vacuum to that surface of the tube. Vacuum tubes of this general type are known in the art and are illustrated, for example, in the before mentioned Research Disclosure Publication No. 15,056.

One or more vacuum belts 100 extend around the vacuum tubes 90 and 96 and are driven in a clockwise direction. The belts 100 have a plurality of ports or openings 101 therethrough for permitting a partial vacuum (i.e., subatmospheric pressure) to communicate with a sheet of paper attached to the belts. The belts 100 have substantially planar upper and lower surfaces, the lower surface being immediately above the upper surface of the platen 70. The space between the upper and lower portions of the belts is occupied by a housing 102 that defines a vacuum plenum 104. Ports 106 in the housing permit a vacuum to be applied from the plenum through the ports to the belts to adhere a document sheet to the belts.

Document sheets advanced to the exposure station are registered by means of a gate 110 which is moved between a registration position (illustrated in FIG. 2) wherein it lies across the path to be taken by a document sheet over the platen and an elevated position (not shown) wherein it is out of the way of the document sheet so that the sheet can be driven from the platen. When the gate is lowered it stops the sheet at the exposure position where it can be copied by the apparatus shown in FIG. 1. Movement of gate 110 is controlled by any suitable means, such as by a solenoid 112 that is coupled to the gate and operated by the LCU. In order to operate the solenoid 112 at the appropriate time a leading edge detector 114 is provided and located along the sheet path ahead of the gate. The leads for the sheet edge detector are coupled to the LCU so as to signal the LCU when a sheet is approaching the gate. The LCU then furnishes a command signal to the solenoid to position the gate across the sheet path. After the LCU flashes the lamps 72 to exposure the document, the LCU then operates the solenoid to elevate the gate and permit passage of the document sheet. When multiple copies of a sheet are required, the gage 110 can remain in its registration position as will be apparent in the subsequent description of the operation of the apparatus. As explained later in more detail, in some modes of operation the LCU can stop belts 100 a predetermined time interval after the leading edge of a sheet is detected by sensor 114 in order to effect registration of the sheet at the exposure position. If this mode of registration is desired for all modes of operation of the apparatus, then gate 110 and solenoid 112 can be eliminated.

When the document sheet leaves the platen it travels around the left portion of the vacuum tube 96. As it reaches the top of the vacuum tube it can be stripped from the tube and the vacuum belt by means of a deflector 116 which has a lower end portion that is positionable with respect to the belt to cause the document sheet to engage and ride along the upper surface 118 of the deflector. The upper end portion of the deflector is positioned so that the sheets stripped from the belt are guided by the deflector back into the tray 84 on top of any other sheets S that remain in the tray. The deflector is mounted for movement about a pivot 119 between the solid and dotted line positions illustrated in FIG. 2 so that for some modes of operation the deflector can be moved to its dotted line position where it is spaced from the sheet path and therefore does not deflect the document sheet into the tray. When the deflector is in its dotted line position, the sheet continues to adhere to the vacuum belts for repeated transport back to the platen 70 along an endless recirculating path defined by the belts and not including tray 84. Movement of the deflector between its two positions is under control of the LCU and may be effected by any suitable means, such as by a solenoid 121. Valve member 98 is moved to its solid line position to prevent the application of vacuum to an area of the tube 96 and belt 100 immediately below the lower end of the deflector 116 when it is desired to separate a sheet from the belt and tube and return the sheet to the tray. When the valve blocks the application of vacuum to that area, it allows the sheet to straighten out as it reaches the top of the cylindrical surface of the vacuum tube. As the sheet assumes its normal flat condition it engages the surface 118 of the deflector 116. On the other hand, when the deflector is in the position shown in dotted lines in FIG. 2 and the valve 98 is moved to its dotted line position, vacuum continues to be applied to all portions of the tube 96 adjacent to the sheet path to thereby continue to adhere a document sheet to the vacuum belts for continued transport along the upper reach of the belts.

In order to coordinate operation of the recirculating feeder 92 with the copier apparatus, input data is provided to the LCU by means of a plurality of conductors shown diagrammatically at 120 in FIG. 1, such being data obtained from various sensors that indicate to the LCU the status and operating conditions of the recirculating feeder. Control signals from the LCU back to the recirculating feeder are provided by means of a bundle of conductors shown generally at 122 in FIG. 1. Data indicating the number of copies to be made is provided to the LCU by means of a keyboard 124. Adjacent to the keyboard 124 there is preferably a mode control shown generally at 126 in FIGS. 1 and 3. The mode control 126 includes a knob 128 which is adjustable to any of a plurality of positions designated 1, 2, 3 and N which are indicative of the number of sheets in the original document that are to be copied. The significance of these positions will become more apparent from the following description of the various modes of operation of the apparatus of the invention.

The length of the surface of the belts 100 preferably is equal to a multiple of the pitch on the photoconductor 16. The pitch on the photoconductor is equal to the image width on the photoconductor plus the interframe width (i.e., the spacing between adjacent images). In the description of the modes of operation described hereinafter the belt length will be assumed to be equal to three times the pitch on the photoconductor. In this example, the path length for recirculation of a sheet from the tray 84 to the exposure position at the platen 70 and then back to the tray is less than four times the pitch on the photoconductor.

The apparatus of the invention is adapted to operate in at least four modes of operation depending on the number of original document sheets in the set in the tray 84. Each of these modes of operation will be separately described.

Assuming initially that a set of four or more document sheets are present in tray 84 and the set is to be copied one or more times to produce collated sets of copies. The number of set copies to be made is furnished to the LCU by means of the keyboard 124. Then the mode control switch 126 is set at position N which is the mode control position for document sets of four or more sheets. When the machine is started, valve 94 moves to its dotted line position so that vacuum is applied to the lower most sheet in the tray, thereby attracting the lower sheet to the belts 100. The belts 100 are being driven at this time so that the sheet is withdrawn from the bottom of the stack and fed around the tube 90 and to the exposure station immediately above platen 70. When the sheet reaches the leading edge detector 114, a signal is sent to the LCU so that the gates 100 is moved to the position shown in the drawings wherein it can be engaged by the document sheet to register the document sheet at the exposure position. The LCU then operates the copier 10 by flashing lamp 72 to provide an image onto the photoconductor 16. This image is then processed and transferred to a copy sheet in the manner previously described, and the resulting copy sheet is delivered either to the hopper 42 or into the finisher 46. In either event, the first copy sheet is located at the bottom of the stack of copy sheets with the image facing up.

After the document sheet is exposed, gate 100 is moved out of its lowered position and the sheet is again advanced by the belts, this time around the vacuum tube 96. Valve 98 is in its solid line position for this mode of operation. As the sheet reaches the position directly above the valve 98 the vacuum supply is no longer effective to hold the sheet onto the belts. The sheet tends to straighten out, and the presence of deflector 116, now in its solid line position, allows the sheet to engage surface 118 of the deflector and be delivered onto the top of the document sheets that remain in the tray.

At the appropriate time in the machine cycle, as determined by the LCU, valve 94 is again moved to its dotted line position so that the leading edge of the second sheet from the bottom of the set is attracted to the vacuum belts and withdrawn from the tray for copying as previously explained. After one complete set of copies have been produced, all of the document sheets S are in the tray in their original order and facing upwardly. If additional sets of copies have been requested, the process is repeated until all of the sets of copies are delivered into the tray 42 or to the finisher 46. Each copy sheet furnished to the tray or the finisher is delivered on top of the previously delivered copy sheets so that collated sets of copies are obtained.

When the original set of document sheets comprises one, two or three sheets and only one copy of the set is to be made, the mode of operation is the same as that previously described for a document comprising four or more sheets. However, if more than one set of copies is required, then the mode of operation is changed in a way which reduces paper handling and permits greater productivity from the copier by allowing it to operate at its maximum rate.

When the original document comprises a set of three sheets and the set is to be copied more than once, the mode control 126 is set as the number 3, and this conditions the LCU to operate the feeder in a simplified manner. The LCU provides a signal to solenoid 121 that moves the deflector 116 to its dotted line position where it is ineffective to strip document sheets from the belts. The valve 98 also is moved to its dotted line position so that the document sheets travelling around tube 96 continues to be attracted to the vacuum belts. Then the LCU initiates operation of the feeder to remove the lower most document sheet from the bottom of the tray in the manner previously described. After the trailing edge of the first sheet is removed from the tray the valve 94 again is moved to its dotted line position to withdraw the second sheet from the tray. The second sheet is adhered to the belts behind the first sheet and the leading edge of the second sheet is spaced from the leading edge of the first sheet by a distance equal to the pitch on the photoconductor 16. In a similar manner the third sheet is withdrawn and adhered to the belts immediately behind the second sheet and the leading edge of the second and third sheets are separated by a distance equal to the pitch on the photoconductor. As previously mentioned, it is assumed in this example that the belts 100 are equal in length to three times the pitch on the photoconductor. Since all of the sheets of this three page document are accommodated on the belts simultaneously, the belts sequentially transport the document sheets about the endless path defined by the belts a sufficient number of times to make all of the required set of copies.

The LCU will stop belts 100 a predetermined time interval after the leading edge is detected by sensor 114. The interval is sufficient to effect registration of the sheet at gate 110 without significant slipping of the sheet on the belts since exessive slippage would adversely affect the relative spacing between the sheet at the exposure station and the following sheet. When the LCU recognizes the beginning of the last cycle of operation, the deflector 116 and valve 98 are moved to their solid line positions so that the document sheets are stripped from the belts and returned to the tray. The first document sheet returned to the tray was the bottom most sheet in the tray 84 before circulation of the sheets.

When multiple sets of a document comprising two sheets have been requested through the keyboard 124 and by setting of the mode control to the position 2, the mode of operation is substantially the same as that described hereinbefore for a document comprising three sheets. However, the feeding of the second sheet onto the belts is delayed by one half the pitch on the photoconductor to equally space the sheets on the belts. Also, the LCU increases the speed of the belts by one half before the copying cycle begins. This allows the belts to be driven at a constant speed and to furnish document sheets to the exposure position seriatim at the same rate as when the document set comprises three or more sheets. The sheets are held on the belts until all of the requested sets of copies are made and then the bottom most sheet of the set (i.e., the first one fed to the belt) is removed from the belts by positioning deflector 116 and valve 98 in their solid line positions.

When a single-sheet document is to be copied one or more times, the sheet is withdrawn from the tray and delivered to the exposure position above the platen as previously explained. Then the vacuum belt is stopped with the sheet aligned at the exposure position and the sheet is held in this position until all of the requested copies have been made. Then the document sheet is returned to the tray. This mode of operation also can be used any time that multiple document sheets are placed in the tray but non-collated copies are requested. Thus two or more document sheets could be placed in the tray, fed to the exposure position once for copying a multiple number of times and then returned to the tray without recirculating the sheets.

In the specific examples previously explained the surface of belts 100 was assumed to be equal to a multiple (three times) the pitch of the photoconductor. This relationship can be varied if desired. For example, a different relationship might be used where reduction copying was desired.

While the apparatus of the invention and its modes of operation have been described in connection with the copying of simplex document sheets onto one side of a copy sheet, it will be understood that the recirculating feeder structure can be used in combination with a copier/duplicator apparatus that is capable of copying on both sides of a copy sheet for producing duplex or two-sided copies.

The recirculating feeder of the present invention provides a number of advantages. For example, the document sheets are constantly held by the vacuum belts during transport and at the exposure position. This eliminates some difficulties associated with certain types of papers such as Vellum, glossy and paste up originals. In addition, feeding of the document sheets and stacking of them in the tray are performed at relatively low velocities and low accelerations, thereby minimizing difficulties associated with aerodynamics effects on paper handling, and also reducing static charging. This reduction of relative velocities and accelerations in the feeder allows the process rate of the copier to be increased with greater confidence in document handling reliability than with some existing feeders. In addition, the compactness and simplicity of the feeder make it easier for the operator to use it. The feeder's working height is reduced, and jam clearance is relatively easily handled. In addition, for documents that are repeatedly copied without being returned to the tray, there is less document handling and therefore less likelihood that the document will become damaged. There is good control of the document sheets, and fewer chances of paper jams.

The invention has been described in detail with particular reference to preferred embodiments thereof, but it will be understood that variations and modifications can be effected within the spirit and scope of the invention.

What is claimed is:

1. In an apparatus for feeding document sheets seriatim to an exposure station of a copier for exposure, including support means for receiving and holding a plurality of document sheets, means for removing the sheets sequentially from the support means and means for returning the removed sheets to the support means following a plurality of exposures at the exposure station, the improvement comprising:
   means for repeatedly transporting the removed sheets seriatim to the exposure station for exposure prior to returning the removed sheets to said support means.

2. A recirculating document feeder for feeding seriatim document sheets to an exposure station of a copier whereat the sheets can be exposed for copying, the feeder comprising:
   a support for receiving and holding a plurality of document sheets;
   means for removing sheets sequentially from the support;
   means for transporting removed sheets seriatim to the exposure station repeatedly for exposure a plurality of times without returning the sheets to the support; and
   means for returning such removed sheets to the support only after each sheet has been transported to the exposure station a plurality of times.

3. The invention as set forth in claim 2 wherein the returning means comprises a sheet deflector mounted adjacent to the support and the transporting means for movement between (1) a first position wherein the deflector can strip a sheet from the transporting means and guide it back to the support, and (2) a second position wherein the deflector is ineffective to strip a sheet from the transporting means.

4. The invention as set forth in claim 3 wherein the transporting means comprises a vacuum belt movable along an endless path, the belt having a plurality of holes therethrough, and means for applying a partial vacuum to the belt for adhering a sheet to the belt.

5. A recirculating document feeder for feeding seriatim document sheets to an exposure station of a copier whereat the sheets can be exposed for copying, the feeder comprising:
   a support for receiving and holding a set of document sheets;
   means for removing sheets sequentially from the support;
   a sheet transport for circulating sheets removed from the support to the exposure station and then away from the exposure station, the transport comprising at least one vacuum belt and being sufficiently large to simultaneously circulate a plurality of document sheets in non-overlapping relation;
   means for separating a sheet from the sheet transport and directing the separated sheet to the support; and
   control means for selectively operating the removing means, the sheet transport and the separating means (1) in a sequence that produces a first mode of operation wherein each sheet removed from the support by the removing means is circulated once by the transport to the exposure station for exposure and then separated from the transport by the separated means and directed back to the support and (2) in a sequence that produces a second mode of operation wherein a plurality of sheets are removed seriatim from the support means by the removing means, and then circulated by the transport a plurality of times to the exposure station for exposure once each time each sheet is circulated to the exposure station and without returning the sheets to the support, and then separated seriatim from the transport by the separating means and directed back to the support.

6. The invention as set forth in claim 5 wherein the control means selectively operates the removing means, the sheet transport and the separating means in a sequence that produces a third mode of operation wherein a single document sheet is removed from the support by the removing means and circulated once by the transport to the exposure station for exposure one or more times and then separated from the transport and directed back to the support.

7. The invention as set forth in claim 6 further comprising means for indicating to the control means the number of document sheets in the support to be circulated for exposure, and the control means comprising means responsive to the indicating means (1) for operating the removing means, the sheet transport and the separating means in the first mode of operation when the indicating means indicates that the number of sheets in the support to be circulated exceeds the number of sheets that can be simultaneously circulated by the transport, (2) for operating the removing means, the sheet transport and the supporting means in the second mode of operation when the indicating means indicates that the number of sheets in the support to be circulated is more than one but equal to or less than the number of sheets that can be simultaneously circulated by the transport, and (3) for operating the removing means, the transport and the separating means in the third mode of operation when the indicating means indicates that there is a single sheet in the support.

8. The invention as set forth in claim 6 wherein the control means comprises a programmable logic and control unit for receiving input signals and for producing output signals, the sheet transport comprises a vacuum belt movable along an endless path past the support, the exposure station and the separating means, the belt being of a size to transport a plurality of documents simultaneously in spaced relation on a surface of the belt, the invention further comprising mode control means coupled to the unit and adjustable to various positions to produce input signals for the unit indicative of the number of sheets in the set, and the unit being responsive to the signals received from the mode control means to operate the removing means, the sheet transport and the separating means (1) in the first mode of operation when the mode control means signals the unit that the number of sheets in the set exceeds the number of sheets that can be simultaneously transported by the belts, (2) in the second mode of operation when the mode control means signals the unit that the number of sheets in the set is more than one but less than the number of sheets that can be simultaneously transported by the belt, and (3) in the third mode of operation when the mode control means signals the unit that there is a single sheet in the set.

9. The invention as set forth in claim 8 wherein the mode control means is adjustable to a position to produce an additional input signal to the unit indicating that the number of sheets in the set is more than one but less than the maximum number that can be simultaneously transported by the belt, and the unit being responsive to said additional input signal to operate the removing means, the sheet transport and the separating means in a sequence that produces a fourth mode of operation wherein the sheets are removed seriatim from the support means by the removing means in a timed sequence that equally spaces the sheets on the belt, then the sheets are circulated by the transport a plurality of times to the exposure station for exposure once each time each sheet is circulated to the exposure station and without returning the sheets to the support, and then separated seriatim from the transport by the separating means and directed back to the support.

* * * * *